United States Patent
Li et al.

(10) Patent No.: US 10,612,443 B2
(45) Date of Patent: Apr. 7, 2020

(54) EXHAUST GAS POST-TREATMENT APPARATUS

(71) Applicant: TENNECO (SUZHOU) EMISSION SYSTEM CO., LTD., Kunshan, Suzhou, Jiangsu (CN)

(72) Inventors: Shuo Li, Jiangsu (CN); Jianghua Wang, Jiangsu (CN); Cong Wang, Jiangsu (CN)

(73) Assignee: TENNECO (SUZHOU) EMISSION SYSTEM CO., LTD., Kunshan, Suzhou (CN)

( * ) Notice: Subject to any disclaimer, the term of this patent is extended or adjusted under 35 U.S.C. 154(b) by 0 days.

(21) Appl. No.: 16/486,988

(22) PCT Filed: Jun. 2, 2017

(86) PCT No.: PCT/CN2017/086988
§ 371 (c)(1),
(2) Date: Aug. 19, 2019

(87) PCT Pub. No.: WO2018/149053
PCT Pub. Date: Aug. 23, 2018

(65) Prior Publication Data
US 2020/0018213 A1   Jan. 16, 2020

(30) Foreign Application Priority Data

Feb. 20, 2017  (CN) .......................... 2017 1 0090260

(51) Int. Cl.
*F01N 3/28*       (2006.01)
*F01N 3/20*       (2006.01)
(Continued)

(52) U.S. Cl.
CPC ....... *F01N 3/2892* (2013.01); *B01D 53/9431* (2013.01); *B01F 3/04049* (2013.01);
(Continued)

(58) Field of Classification Search
None
See application file for complete search history.

(56) References Cited

U.S. PATENT DOCUMENTS

| 2,203,554 A | 6/1940 | Uhri, Jr. et al. |
| 9,103,258 B2 | 8/2015 | Norling et al. |

(Continued)

FOREIGN PATENT DOCUMENTS

| CN | 105074152 A | 11/2015 |
| CN | 204827615 U | 12/2015 |

(Continued)

OTHER PUBLICATIONS

Hua et al. (CN205714374U)—translated document) (Year: 2016).*

*Primary Examiner* — Walter D. Griffin
*Assistant Examiner* — Jelitza M Perez
(74) *Attorney, Agent, or Firm* — Harness, Dickey & Pierce, P.L.C.

(57) ABSTRACT

An exhaust gas post-treatment apparatus comprises a first mixing chamber assembly and a second mixing chamber assembly. The first mixing chamber assembly comprises a first housing provided with a first mixing chamber, a gas inlet pipe, a first mixing pipe at least partially located in the first mixing chamber and a perforated pipe located in the first mixing pipe. The first mixing pipe includes a first pipe body located in the first mixing chamber and a second pipe body extending from the first mixing chamber, wherein a side wall of the first pipe body is provided with apertures and flow plates located in the first mixing chamber. In the axial direction of the perforated pipe, the perforated area of the perforated pipe fully covers the length of the flow plates. The second mixing chamber assembly includes a flow-guiding hood.

10 Claims, 9 Drawing Sheets

(51) Int. Cl.
*B01D 53/94* (2006.01)
*B01F 5/06* (2006.01)
*B01F 5/00* (2006.01)
*B01F 3/04* (2006.01)
*B01F 5/04* (2006.01)

(52) U.S. Cl.
CPC .......... *B01F 5/0065* (2013.01); *B01F 5/0473* (2013.01); *B01F 5/0648* (2013.01); *B01F 5/0688* (2013.01); *F01N 3/2066* (2013.01); *F01N 2610/02* (2013.01); *F01N 2610/1453* (2013.01)

(56) References Cited

U.S. PATENT DOCUMENTS

| | | |
|---|---|---|
| 9,352,276 B2 | 5/2016 | Sampath |
| 9,683,476 B2 | 6/2017 | Nagata et al. |
| 10,188,994 B2 | 1/2019 | Tyni et al. |
| 2014/0311133 A1 | 10/2014 | Norling et al. |
| 2015/0361852 A1 | 12/2015 | Nagata et al. |

FOREIGN PATENT DOCUMENTS

| | | | |
|---|---|---|---|
| CN | 205714373 U | | 11/2016 |
| CN | 205714374 U | * | 11/2016 |
| CN | 205714374 U | | 11/2016 |
| CN | 205714382 U | | 11/2016 |
| CN | 206477903 U | | 9/2017 |
| WO | 2011101896 A1 | | 8/2011 |
| WO | 2013048309 A1 | | 4/2013 |
| WO | 2017032231 A1 | | 3/2017 |

* cited by examiner

EXHAUST GAS POST-TREATMENT APPARATUS

CROSS-REFERENCE TO RELATED APPLICATIONS

The present application is the U.S. National Phase Application under 35 U.S.C. 371 of International Application No. PCT/CN2017/086988 filed on Jun. 2, 2017, which claims the priority of Chinese patent application no. 201710090260.6 with invention title "Exhaust gas post-treatment apparatus" filed on Feb. 20, 2017. The entire contents of each of the above applications are incorporated herein by reference.

The present application claims the priority of Chinese patent application no. 201710090260.6 with invention title "Exhaust gas post-treatment apparatus" filed on Feb. 20, 2017, the entire contents of which are incorporated herein by reference.

TECHNICAL FIELD

The present invention relates to an exhaust gas post-treatment apparatus, in the technical field of engine exhaust gas post-treatment.

BACKGROUND ART

Research has shown that the degree of uniformity of the distribution of ammonia in a pipeline of an exhaust gas post-treatment system (e.g. a selective catalytic reduction system, SCR system) has an important influence on the overall performance and durability of the system. If the distribution of ammonia is not uniform, this will lead to an excessive amount of ammonia in local regions and thereby easily cause leakage of ammonia, and cause an excessively low efficiency of conversion of nitrogen oxides (NOx) in other regions where ammonia is rarefied. A non-uniform distribution of ammonia for a long period of time will lead to non-uniform ageing of the catalyst, thereby affecting the overall performance of the catalyst. Furthermore, a non-uniform distribution of urea droplets will cause an excessively low temperature of a local pipe wall or mixing structure, and crystals will form; in serious cases, the exhaust pipe will be blocked, leading to a drop in the motive power performance of the engine.

Chinese invention patent no. CN205714382U, announced on 23 Nov. 2016, has disclosed an engine exhaust gas post-treatment system in which a multi-holed pipe is added in a mixing pipe. Such a solution reduces the probability of urea coming into direct contact with a pipe wall, because the urea can be broken up in advance, and reduces the risk of urea crystallization to a certain extent. However, in that design, due to the fact that no multi-holed pipe is disposed at the position of a fin, urea droplets can directly strike the fin as well as a junction between the multi-holed pipe and the mixing pipe, so the risk of crystallization remains. Furthermore, the question of how to better support the multi-holed pipe is also a technical problem in need of a solution.

CONTENT OF THE INVENTION

An object of the present invention is to provide an exhaust gas post-treatment apparatus with strong anti-urea-crystallization ability.

To achieve the abovementioned object, the present invention employs the following technical solution: an exhaust gas post-treatment apparatus, comprising a first mixing chamber assembly, a second mixing chamber assembly located downstream of the first mixing chamber assembly, and a catalyst support assembly located downstream of the second mixing chamber assembly; the first mixing chamber assembly comprising a first housing provided with a first mixing chamber, a gas intake pipe in communication with the first mixing chamber, and a first mixing pipe at least partially located in the first mixing chamber; the first mixing pipe being provided with a first pipe body located in the first mixing chamber, and a second pipe body extending out of the first mixing chamber, wherein a sidewall of the first pipe body is provided with a number of rotational flow plates located in the first mixing chamber; the second mixing chamber assembly comprising a second housing, and a second mixing pipe located in the second housing; the second mixing pipe being provided with a flow-guiding hood, which is directly opposite the first mixing pipe so as to force a gas flow to flow in a reverse direction; the exhaust gas post-treatment apparatus further comprises a multi-holed pipe located in the first mixing pipe; in an axial direction of the multi-holed pipe, an opening region of the multi-holed pipe completely covers a length of the rotational flow plates.

In a further improved technical solution of the present invention, the first housing is provided with an end wall for mounting a urea nozzle; one end of the multi-holed pipe is fixed to an inner side of the end wall, and another end of the multi-holed pipe extends into the second pipe body.

In a further improved technical solution of the present invention, the other end of the multi-holed pipe is provided with a number of radially protruding support arms fixed to an inner wall of the second pipe body.

In a further improved technical solution of the present invention, the multi-holed pipe is arranged coaxially with the first mixing pipe, and an annular gap in communication with the rotational flow plates is formed between the multi-holed pipe and the first mixing pipe.

In a further improved technical solution of the present invention, the gas intake pipe and the first mixing pipe are arranged side by side and in parallel; the gas intake pipe is provided with a gas intake cone, a gas intake multi-holed pipe mated with the gas intake cone, and a blind flange plate mated with the gas intake multi-holed pipe; the gas intake multi-holed pipe is located in the first mixing chamber, the gas intake cone is located at one side of the gas intake multi-holed pipe, and the blind flange plate is located at another side of the gas intake multi-holed pipe, wherein the gas intake cone and the blind flange plate are both detachably connected to the first housing.

In a further improved technical solution of the present invention, a sidewall of the first pipe body is provided with a number of openings located between the rotational flow plates and the end wall, the openings being in communication with the first mixing chamber.

In a further improved technical solution of the present invention, the first mixing chamber assembly is provided with a first flange welded to the second pipe body, and the second mixing chamber assembly is provided with a second flange welded to the second housing; the first flange and the second flange are detachably connected together by bolts.

In a further improved technical solution of the present invention, the flow-guiding hood is bowl-shaped, and is provided with an arc-shaped end wall.

In a further improved technical solution of the present invention, the second mixing chamber assembly is provided with a first support plate and a second support plate which support the second mixing pipe; the first support plate and the second support plate are parallel to each other; the second mixing pipe passes through the first support plate and the second support plate; a first gap allowing a gas flow to pass through is provided between the first support plate and an inner wall of the second housing; a second gap allowing a gas flow to pass through is provided between the second support plate and the inner wall of the second housing.

In a further improved technical solution of the present invention, the catalyst support assembly comprises a selective catalytic reductant; the catalyst support assembly and the second housing are detachably connected together.

Compared with the prior art, in the present invention the multi-holed pipe is disposed in the first mixing pipe, and the opening region of the multi-holed pipe completely covers the length of the rotational flow plates in the axial direction of the multi-holed pipe; with this arrangement, an injection cone angle can be protected, avoiding as far as possible direct impingement of urea droplets on the rotational flow plates, and thereby reducing the risk of crystallization. By providing the multi-holed pipe, the positions of the rotational flow plates are protected, and better flexibility is provided for the length design of the rotational flow plates. Furthermore, by adjusting a hole diameter of a region of the multi-holed pipe that overlaps with the rotational flow plates, inner and outer flow rates of the multi-holed pipe can be adjusted, thereby making greater use of heat inside the pipe, increasing flow speed, and in turn accelerating the breaking up of urea, and improving the anti-crystallization ability of the first mixing pipe.

DESCRIPTION OF THE ACCOMPANYING DRAWINGS

PARTICULAR EMBODIMENTS

Figure 1:
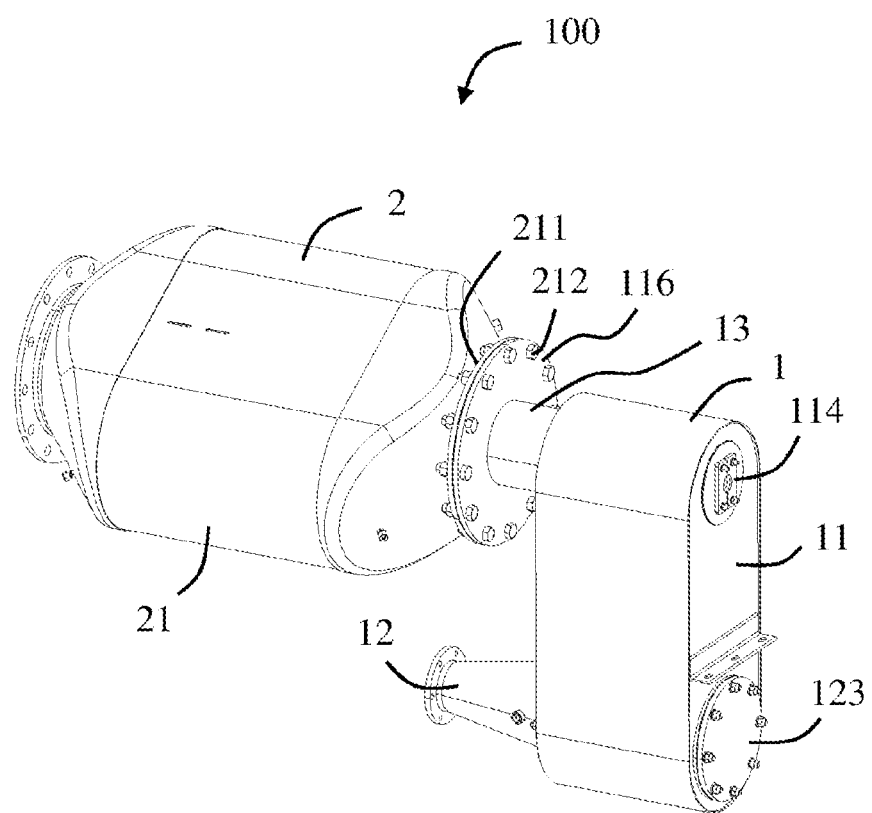
FIG. 1 is a three-dimensional schematic view of the exhaust gas post-treatment apparatus of the present invention.
Figure 2:
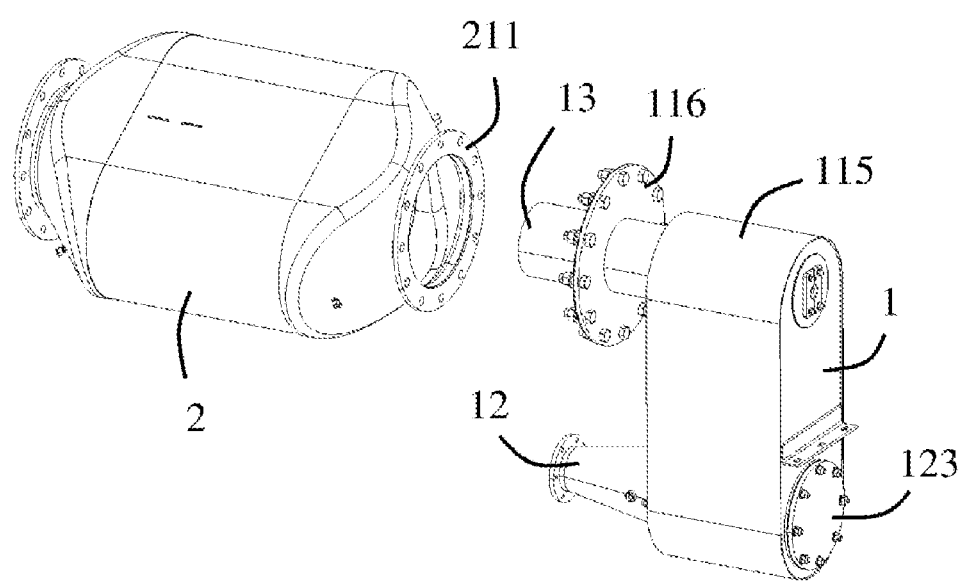
FIG. 2 is a partial three-dimensional exploded view of FIG. 1.
Figure 3:
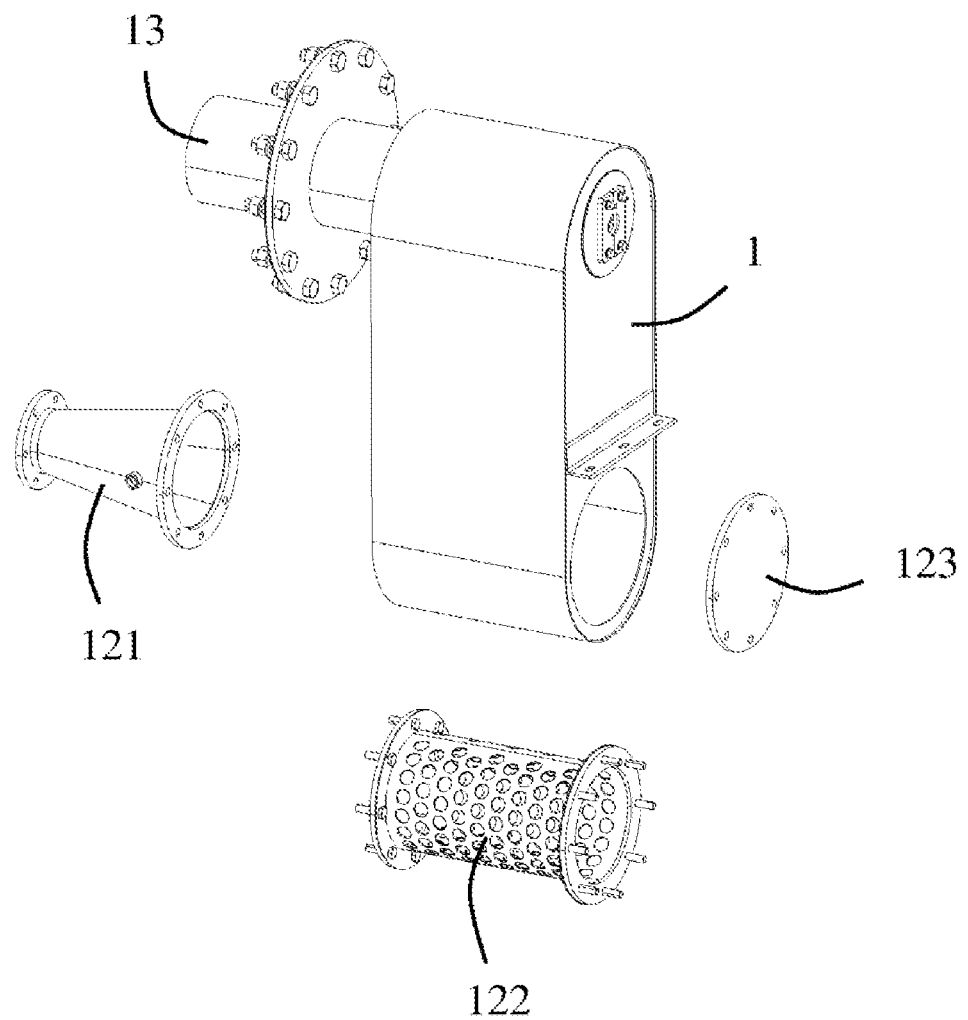
FIG. 3 is a partial three-dimensional exploded view of the first mixing chamber assembly in FIG. 2.

Referring to FIGS. 1-9, disclosed in the present invention is an exhaust gas post-treatment apparatus 100, used to treat exhaust gas of an engine. The exhaust gas post-treatment apparatus 100 comprises a first mixing chamber assembly 1, a second mixing chamber assembly 2 located downstream of the first mixing chamber assembly 1, and a catalyst support assembly 3 located downstream of the second mixing chamber assembly 2. In the embodiment shown in the figures of the present invention, the catalyst support assembly 3 comprises a selective catalytic reductant.

The first mixing chamber assembly 1 comprises a first housing 11 provided with a first mixing chamber 10, a gas intake pipe 12 in communication with the first mixing chamber 10, and a first mixing pipe 13 at least partially located in the first mixing chamber 10. The gas intake pipe 12 and the first mixing pipe 13 are arranged side by side and in parallel. The gas intake pipe 12 is provided with a gas intake cone 121, a gas intake multi-holed pipe 122 mated with the gas intake cone 121, and a blind flange plate 123 mated with the gas intake multi-holed pipe 122. The gas intake multi-holed pipe 122 is located in the first mixing chamber 10, the gas intake cone 121 is located at one side of the gas intake multi-holed pipe 122, and the blind flange plate 123 is located at another side of the gas intake multi-holed pipe 122. The gas intake cone 121 and the blind flange plate 123 are both detachably connected to the first housing 11. With this arrangement, by swapping mounting positions of the gas intake cone 121 and the blind flange plate 123, a gas intake direction of the gas intake pipe 12 can be adjusted, thereby adapting to different mounting requirements. Furthermore, the first housing 11 is provided with an end wall 114, which is used to mount a urea nozzle (not shown in the figures) so as to inject urea into the first mixing pipe 13.

The first mixing pipe 13 is provided with a first pipe body 131 located in the first mixing chamber 10, and a second pipe body 132 extending out of the first mixing chamber 10, wherein a sidewall of the first pipe body 131 is provided with a number of rotational flow plates 1311 located in the first mixing chamber 10, and a number of openings 1312 located between the rotational flow plates 1311 and the end wall 114, wherein the openings 1312 are in communication with the first mixing chamber 10. In the embodiment shown in the figures of the present invention, the first mixing pipe 13 is cylindrical, and the first housing 11 is provided with an arc-shaped upper surface 115, thereby forming an arc-shaped chamber between the upper surface 115 and the first mixing pipe 13, to assist in the formation of rotational flow. The first mixing chamber assembly 1 is further provided with a first flange 116 welded to the second pipe body 132.

The second mixing chamber assembly 2 comprises a second housing 21, a second mixing pipe 23 located in the second housing 21, and a first support plate 24 and a second support plate 25 which are used to support the second mixing pipe 23. The first support plate 24 and the second support plate 25 are parallel to each other. The second mixing chamber assembly 2 is provided with a second flange 211 welded to the second housing 21. The first housing 11 and the second housing 21 are spaced apart from one another; the first flange 116 and the second flange 211 are detachably connected together by bolts 212. With this arrangement, in the present invention, due to the fact that the first pipe body 131 of the first mixing pipe 13 is disposed outside the second housing 21 and covered by the first housing 11, the structural design of the rotational flow plates 1311 on the first pipe body 131 (e.g. the length or density of disposition of the rotational flow plates 1311, etc.) can be flexibly adjusted according to design requirements, avoiding the size restrictions caused by designing the entire first mixing pipe 13 inside a single housing in the prior art. In other words, a mixing structure on the first pipe body 131 can be independently designed, and so avoids being subject to size restrictions of the entire housing. Furthermore, by adjusting mating hole positions of the first flange 116 and the second flange 211 when these are connected by bolts, a mounting angular position of the second mixing chamber assembly 2 and the first mixing chamber assembly 1 can be adjusted, thereby adapting to different mounting requirements.

Figure 9:
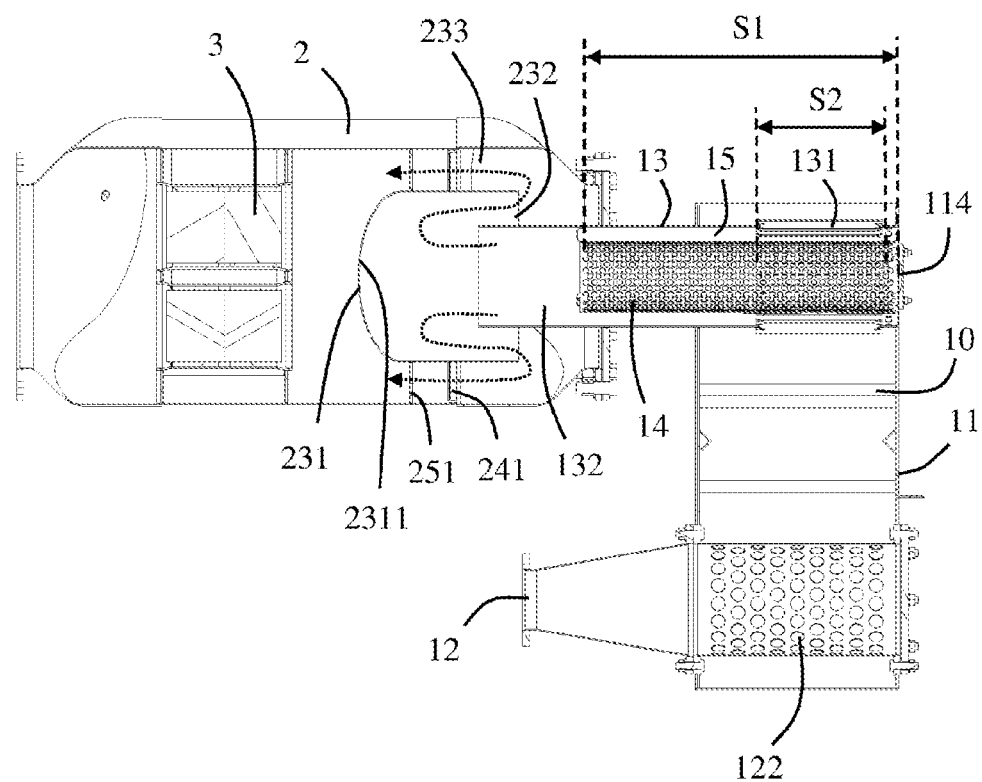
FIG. 9 is a schematic sectional view along line A-A in FIG. 8.

Referring to FIG. 9, the second pipe body 132 of the first mixing pipe 13 at least partially extends into the second mixing pipe 23; the second mixing pipe 23 is provided with a flow-guiding hood 231, which is directly opposite the first mixing pipe 13 so as to force a gas flow to flow in a reverse direction. In an embodiment shown in the figures of the present invention, the flow-guiding hood 231 is bowl-shaped, and is provided with an arc-shaped end wall 2311. A first mixing space 232 is provided between the second pipe body 132 and the second mixing pipe 23; a second mixing space 233 is provided between the second mixing pipe 23 and the second housing 21. The second mixing pipe 23 passes through the first support plate 24 and the second support plate 25. A first gap 241 allowing a gas flow to pass through is provided between the first support plate 24 and an inner wall of the second housing 21. A second gap 251 allowing a gas flow to pass through is provided between the second support plate 25 and the inner wall of the second housing 21.

Figure 4:
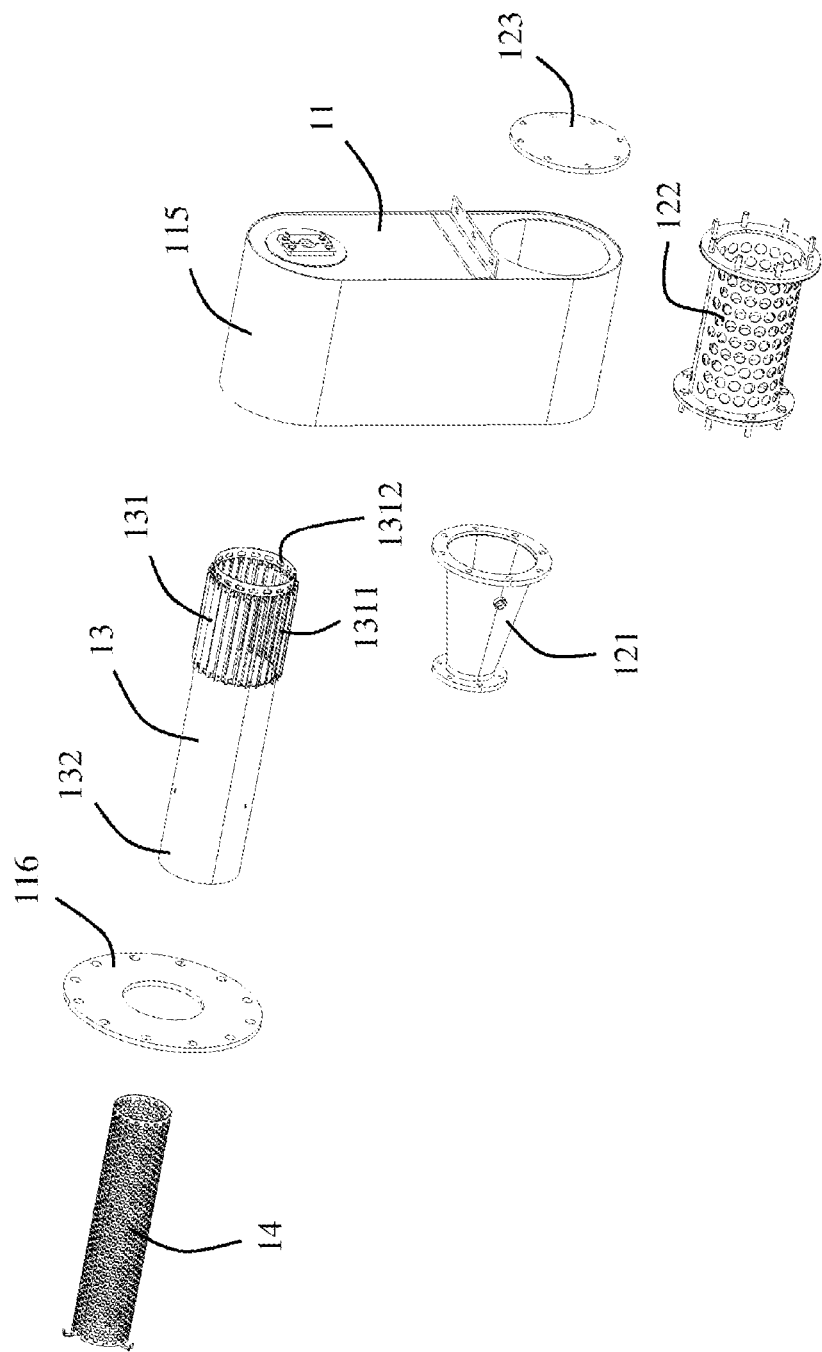
FIG. 4 is a further exploded three-dimensional view of FIG. 3.
Figure 5:
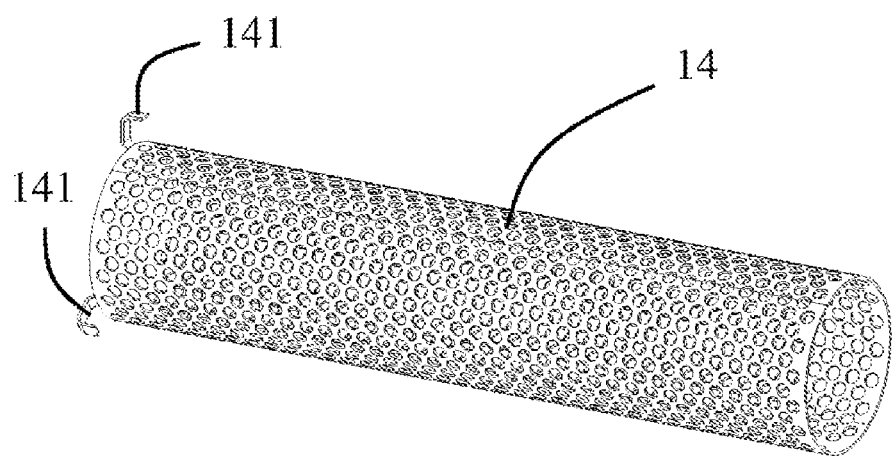
FIG. 5 is a three-dimensional view of the multi-holed pipe in FIG. 4.
Figure 6:
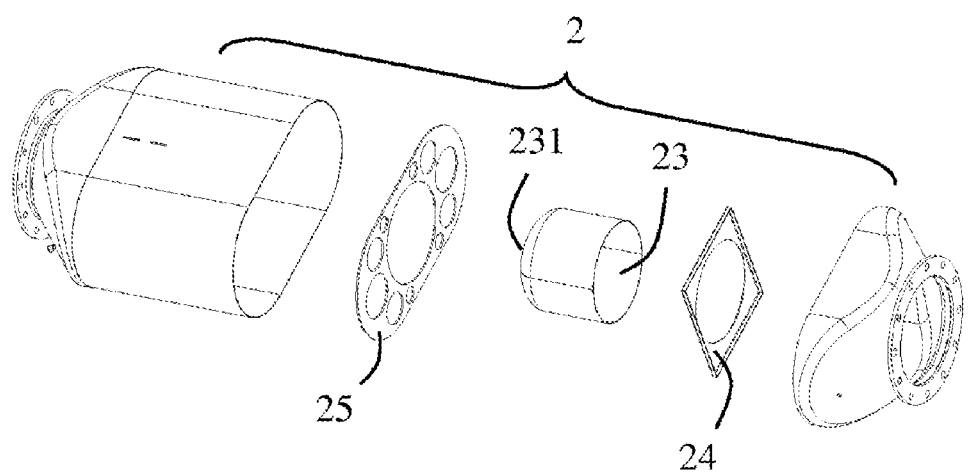
FIG. 6 is a three-dimensional exploded view of the second mixing chamber assembly in FIG. 2.
Figure 7:
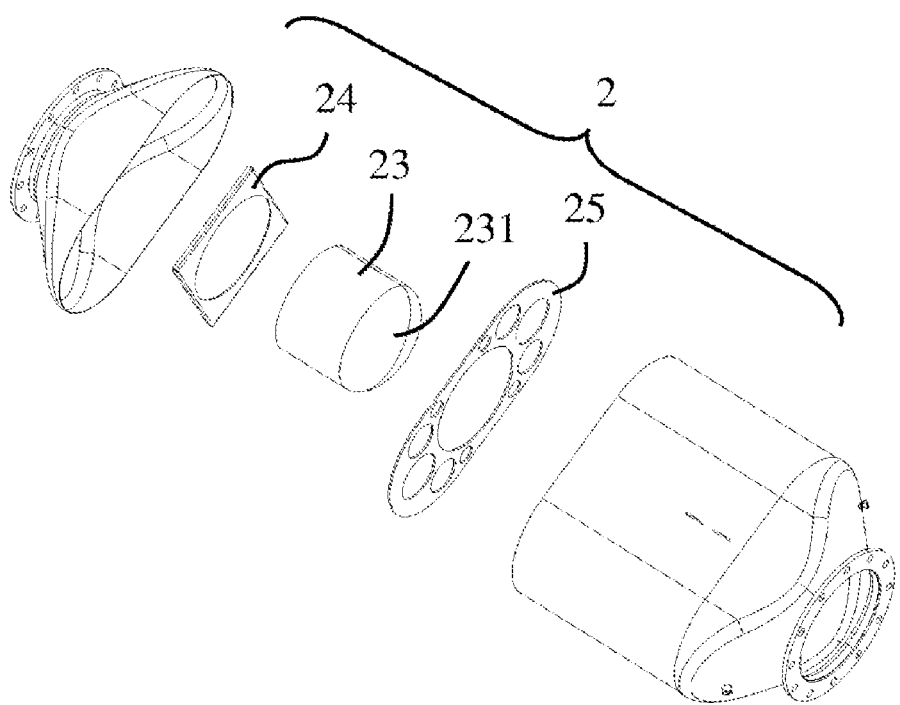
FIG. 7 is a three-dimensional exploded view of FIG. 6 from another angle.
Figure 8:
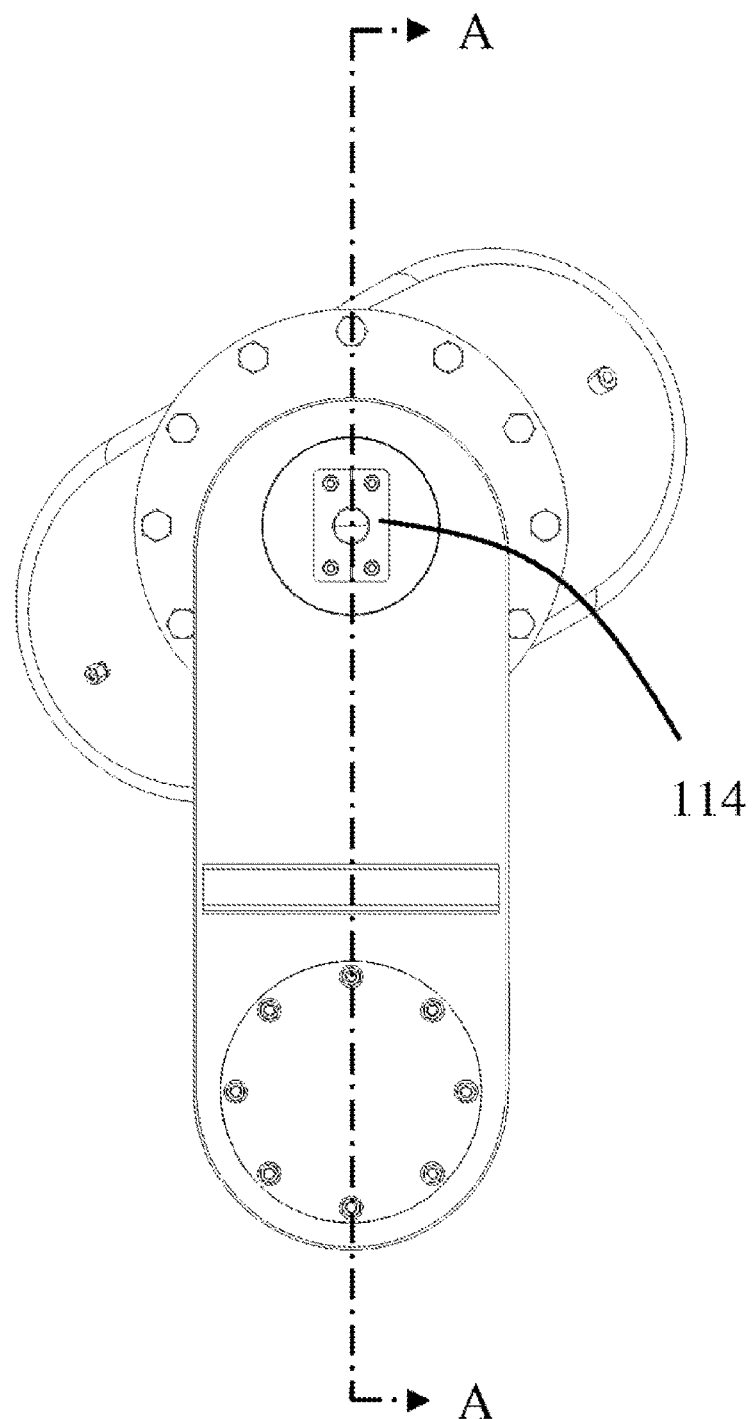
FIG. 8 is a right view of FIG. 1.

Referring to FIGS. 4, 5 and 9, the exhaust gas post-treatment apparatus 100 of the present invention further comprises a multi-holed pipe 14 located in the first mixing pipe 13. The multi-holed pipe 14 is arranged coaxially with the first mixing pipe 13, and an annular gap 15 is formed between the multi-holed pipe 14 and the first mixing pipe 13; the annular gap 15 is in communication with the rotational flow plates 1311. One end of the multi-holed pipe 14 is fixed to an inner side of the end wall 114; another end of the multi-holed pipe 14 extends into the second pipe body 132. In the embodiment shown in the figures of the present invention, the other end of the multi-holed pipe 14 is provided with a number of radially protruding support arms 141; the support arms 141 are fixed to an inner wall of the second pipe body 132. In an axial direction of the multi-holed pipe 14, an opening region S1 of the multi-holed pipe 14 completely covers a length S2 of the rotational flow plates 1311. With this arrangement, an injection cone angle can be protected, avoiding as far as possible direct impingement of urea droplets on the rotational flow plates 1311, and thereby reducing the risk of crystallization. Moreover, by providing the multi-holed pipe 14, the positions of the rotational flow plates 1311 are protected, and better flexibility is provided for the length design of the rotational flow plates 1311. Furthermore, by adjusting a hole diameter of a region of the multi-holed pipe 14 that overlaps with the rotational flow plates 1311, inner and outer flow rates of the multi-holed pipe 14 can be adjusted, thereby making greater use of heat inside the pipe, increasing flow speed, and in turn accelerating the breaking up of urea, and improving the anti-crystallization ability of the first mixing pipe 13. Furthermore, by disposing the support arms 141 outside the injection cone angle remote from the end wall 114, direct impingement of urea on the support arms 141 can be avoided, thereby also lowering the risk of crystallization. By supporting the two ends of the multi-holed pipe 14, the reliability thereby is also increased.

When exhaust gas of the engine enters the first mixing chamber 10 from the gas intake pipe 12, most of the exhaust gas enters the first mixing pipe 13 and the multi-holed pipe 14 while rotating under the guiding action of the rotational flow plates 1311, and a small amount of exhaust gas enters the first mixing pipe 13 from the openings 1312. When an injection condition is met, the urea nozzle injects urea into the first mixing pipe 13, and atomized urea droplets mix with the exhaust gas of the engine and rotate towards a downstream region. Referring to the dotted-line arrows in FIG. 9, thereafter, the gas flow is forced under the action of the flow-guiding hood 231 to flow in a reverse direction (e.g. towards an upstream region) along the first mixing space 232; after the direction reversal, the gas flow moves along the second mixing space 233, and passes through the first gap 241 and the second gap 251 to arrive at the catalyst support assembly 3 located downstream. With this arrangement, the distance and duration of urea evaporation are increased, thereby increasing the uniformity of mixing of the gas flow, and lowering the risk of urea crystallization.

Furthermore, the embodiment above is merely intended to explain the present invention, and does not restrict the technical solution described by the present invention. Understanding of this Description should take those skilled in the art as a basis. Although the present invention has been explained in detail herein with reference to the embodiment above, those of ordinary skill in the art should understand that those skilled in the art could still subject the present invention to amendments or equivalent substitutions, and all technical solutions and improvements thereof which do not deviate from the spirit and scope of the present invention should be included within the scope of the claims of the present invention.

The invention claimed is:

1. An exhaust gas post-treatment apparatus, comprising a first mixing chamber assembly and a second mixing chamber assembly located downstream of the first mixing chamber assembly, the first mixing chamber assembly comprising a first housing including a first mixing chamber, a gas intake pipe in communication with the first mixing chamber, a first mixing pipe at least partially located in the first mixing chamber, and a multi-holed pipe located in the first mixing pipe; the first mixing pipe including a first pipe body located in the first mixing chamber and a second pipe body extending out of the first mixing chamber, wherein a sidewall of the first pipe body is provided with a number of apertures and associated rotational flow plates located in the first mixing chamber wherein, in an axial direction of the multi-holed pipe, an opening region of the multi-hole pipe completely covers a length of the rotational flow plates, the second mixing chamber assembly comprising a second housing and a second mixing pipe located in the second housing; the second mixing pipe including a flow-guiding hood in receipt of a gas flow exiting the first mixing pipe, the flow guiding hood being shaped so as to force the gas flow to flow in a reverse direction.

2. The exhaust gas post-treatment apparatus as claimed in claim 1, wherein the first housing is provided with an end wall for mounting a urea nozzle; one end of the multi-holed pipe is fixed to an inner side of the end wall, and another end of the multi-holed pipe extends into the second pipe body.

3. The exhaust gas post-treatment apparatus as claimed in claim 2, wherein the other end of the multi-holed pipe is provided with a number of radially protruding support arms fixed to an inner wall of the second pipe body.

4. The exhaust gas post-treatment apparatus as claimed in claim 3, wherein the multi-holed pipe is arranged coaxially with the first mixing pipe, and an annular gap in communication with the rotational flow plates is formed between the multi-holed pipe and the first mixing pipe.

5. The exhaust gas post-treatment apparatus as claimed in claim 1, wherein the gas intake pipe and the first mixing pipe are arranged side by side and in parallel; the gas intake pipe is provided with a gas intake cone, a gas intake multi-holed pipe mated with the gas intake cone, and a blind flange plate mated with the gas intake multi-holed pipe; the gas intake multi-holed pipe is located in the first mixing chamber, the gas intake cone is located at one side of the gas intake multi-holed pipe, and the blind flange plate is located at another side of the gas intake multi-holed pipe, wherein the gas intake cone and the blind flange plate are both detachably connected to the first housing.

6. The exhaust gas post-treatment apparatus as claimed in claim 2, wherein a sidewall of the first pipe body is provided with a number of openings located between the rotational flow plates and the end wall, the openings being in communication with the first mixing chamber.

7. The exhaust gas post-treatment apparatus as claimed in claim 1, wherein the first mixing chamber assembly is provided with a first flange welded to the second pipe body, and the second mixing chamber assembly is provided with a second flange welded to the second housing; the first flange and the second flange are detachably connected together by bolts.

8. The exhaust gas post-treatment apparatus as claimed in claim 1, wherein the flow-guiding hood is bowl-shaped, and is provided with an arc-shaped end wall.

9. The exhaust gas post-treatment apparatus as claimed in claim 1, wherein the second mixing chamber assembly is provided with a first support plate and a second support plate which support the second mixing pipe; the first support plate and the second support plate are parallel to each other; the second mixing pipe passes through the first support plate and the second support plate; a first gap allowing a gas flow to pass through is provided between the first support plate and an inner wall of the second housing; a second gap allowing a gas flow to pass through is provided between the second support plate and the inner wall of the second housing.

10. The exhaust gas post-treatment apparatus as claimed in claim 1, wherein a catalyst support assembly is located downstream of the second mixing chamber assembly and comprises a selective catalytic reductant; the catalyst support assembly and the second housing are detachably connected together.

* * * * *